June 30, 1931. E. S. AXLINE 1,812,279
ELASTIC MATERIAL
Filed Aug. 20, 1930
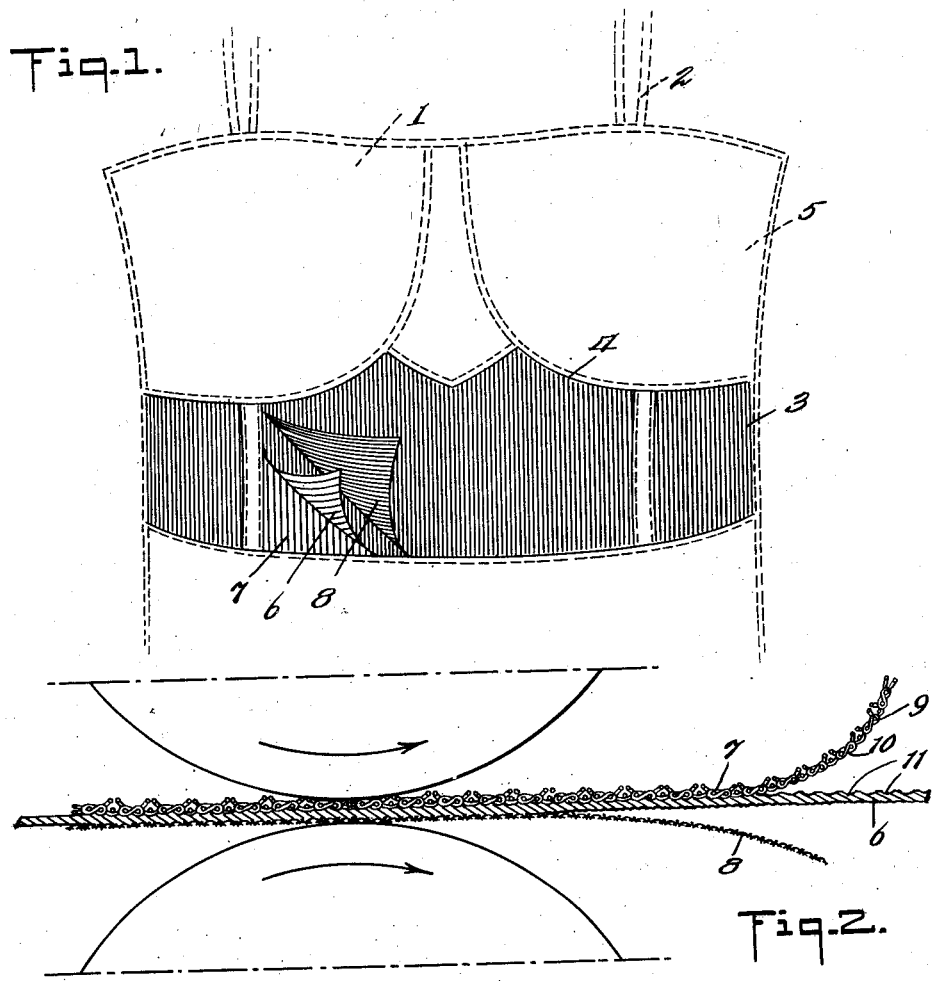
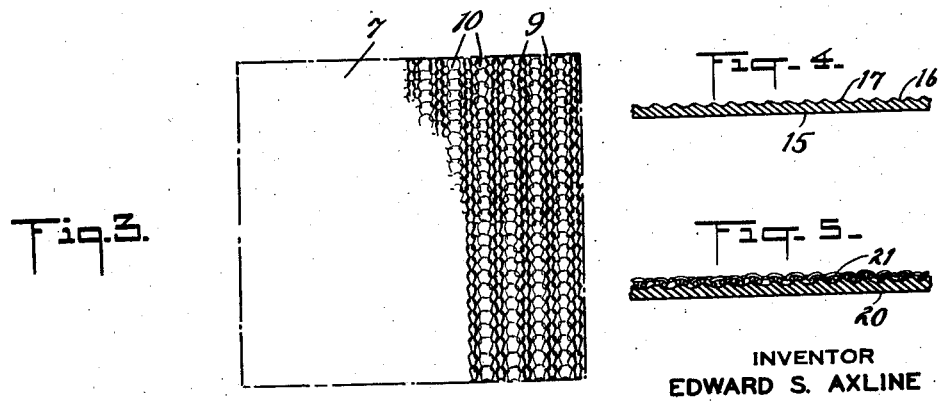
INVENTOR
EDWARD S. AXLINE
BY
ATTORNEY Patented June 30, 1931

1,812,279

UNITED STATES PATENT OFFICE

EDWARD S. AXLINE, OF NEW YORK, N. Y., ASSIGNOR TO ASSOCIATED APPAREL INDUSTRIES, INC., OF CHICAGO, ILLINOIS, A CORPORATION OF ILLINOIS

ELASTIC MATERIAL

Application filed August 20, 1930. Serial No. 476,521.

This invention relates to elastic materials comprising sheet rubber with or without a backing or lining of cloth and with a stockinet in combination therewith and has for an object to provide an elastic material which may be stretched in one direction without narrowing unequally in the other direction so that garments and other articles using this elastic material will hold their shape.

Another object of the invention is to provide a sheet rubber material for figure-molding and reducing garments provided with a surface which has a massaging effect that tends to reduce the fatty tissues.

Another object of the invention is to provide a rubberized fabric for figure molding and reducing garments, having a special stockinet facing forming a cushion which allows adequate ventilation between the rubber and the body of the wearer, absorbs perspiration and eliminates chafing, and also has a massaging effect which tends to reduce the fatty tissues.

Materials of the class referred to have been used for many years in making rubberized gloves, corsets, belts, etc., and are usually composed of silk, cotton or other cloth pressed into one or both sides of a sheet of rubber. Fabric rubberized silk-to-silk is one type which has been proposed but not generally used because it is too expensive, does not have the proper strength, and cannot readily be made with the desired limited degree of stretch.

One disadvantage of the ordinary fabric, rubberized silk-to-stockinet, is that the stretch of the stockinet in at least one direction is longer than that of the silk and therefore allows the silk to break. Another disadvantage is that ordinary stockinet, being highly extensible in one direction, permits the fabric to pull out of shape. Even when the fabric is new, stretching it longitudinally causes it to narrow down transversely, making it difficult to obtain or retain the desired fit in gloves and garments of the type mentioned. Still another disadvantage of the ordinary rubberized fabric used in garments is lack of ventilation due to faulty construction and resulting in irritation to the wearer.

In one form of my improved material I employ a stockinet made of relatively heavy threads with a special mesh which gives increased strength and also gives the stockinet a shorter stretch than heretofore. The limited stretch of the stockinet, being substantially equal to the stretch of the silk facing on the opposite side of the rubber, enables the fabric to hold its shape and prevents the silk from breaking. The threads of the stockinet are woven or knit loosely to form spaced parallel ridges, and the calendering process drives the threads into the rubber in such a way as to form alternate thin and thick streaks or corrugations therein. This makes it possible to obtain any desired controlled stretch for a given weight of rubber, and enables the rubber to stretch laterally without narrowing down unequally in a longitudinal direction.

In another form of my invention a stockinet is used which is not necessarily formed with ridges, but when it is united with the rubber in the calendering process, rolls provided with longitudinal ridges are employed to produce alternate thin and thick parallel streaks or corrugations in the material.

In another modification of my invention sheet rubber alone is run through calendering rolls provided with longitudinal ridges whereby a sheet rubber provided with alternate thin and thick streaks or corrugations is obtained. This product may be subsequently united with a stockinet facing and/or silk lining.

These and other advantages of the invention will be more fully described in connection with the accompanying drawings in which:

Fig. 1 is a front view of a brassière having a waist band constructed according to one modification of the invention, with parts of the elastic fabric folded back to show details of construction;

Fig. 2 is a longitudinal section on an enlarged scale through the elastic fabric shown in Fig. 1, showing the method of fabrication;

Fig. 3 is an enlarged plan view showing one form of stockinet which may be employed in the fabric.

Fig. 4 is an enlarged section through a rubber sheet made in accordance with this invention; and Fig. 5 is an enlarged section through a modified form of the elastic fabric employing an ordinary stockinet.

The brassière shown in Fig. 1 is of the type shown in Patent #1,640,823, issued August 30, 1927 to Katherine E. Cunningham, having an easy fitting vest 1 provided with shoulder straps 2 and an elastic belt portion 3 which is stitched to the vest along the lines 4 which curve upwardly to form the usual pockets 5. The garment may be open at the side or back and provided with hooks and eyes or other suitable fastening means for securing the meeting edges together.

The elastic fabric 3, which constitutes one form of my invention and is shown in Figs. 2 and 3 in more detail, consists of a thin sheet of vulcanized rubber 6 having the stockinet 7 embedded in one side thereof and the silk 8 embedded in the other side. The fabric may be made by calendering a sheet of rubber onto each fabric, joining the rubberized faces together, and then curing the rubber in the usual manner. Another method is to apply uncured rubber compound to one fabric and then apply the other fabric to the rubber, and cure. If desired, the silk facing can be omitted.

The ridged stockinet 7 is here shown as a knit fabric, but it may be woven, braided or otherwise constructed with limited stretch since I do not limit myself to any particular fabric. In any case, however, the stockinet is constructed to provide spaced parallel raised portions or ridges 9 and alternate depressed portions 10. In the knitted fabric, best shown in Fig. 3, these alternate ridges and depressions are formed by proper spacing of the wales, the portions 9 being closely knit and the portions 10 being loosely knit.

When the calendering rolls force the stockinet down into the rubber sheet 6, the ridges 9 form spaced parallel corrugations or streaks 11 in the rubber, as shown in Fig. 2. In this way the rubber is molded into alternate thin and thick streaks. The sheet so molded has the faculty of stretching laterally, or transversely of the corrugations, without narrowing down appreciably in a longitudinal direction, the action in this respect being somewhat analogous to an accordion. Another advantage of molding the rubber in this manner is that it makes it possible to get the desired controlled stretch with a given weight of rubber.

The stockinet 7, and consequently the entire composite fabric, is relatively inextensible in a longitudinal direction, that is, from top to bottom in Figs. 1 and 3, the function in this respect being similar to some ordinary rubberized fabrics. An important novel feature, however, is that by proper allocation of the closely-knit relatively inextensible portions 9, and the loosely-knit relatively extensible portions 10, the lateral stretch may be controlled, and in actual practice I have limited the lateral stretch to about one-half the stretch of ordinary rubberized fabrics. In a garment such as shown in Fig. 1 the ridges 9 and corrugations 11 run vertically, and by limiting the stretch in a horizontal direction the fabric will hold its shape when worn, while fabrics with a much longer stretch pull out of shape. Limiting the stretch of the stockinet to substantially the stretch of the silk 8 also prevents the silk from breaking.

Because of the larger size threads used in the stockinet, and the special mesh and resulting ribbed effect, the stockinet is much thicker than ordinarily employed in rubberized fabrics and provides a much better cushion between the rubber sheet and the body of the wearer. It also absorbs perspiration more easily than the ordinary stockinet. The ribbed effect of the stockinet, heavy thread, loose mesh and thick padding, also allow a certain amount of ventilation between the rubber and the body when the wearer moves about. This eliminates chafing and skin irritation which often results from wearing ordinary rubberized fabric garments.

It will also be seen that the ribbed effect of the stockinet, and the corrugated effect on the rubber, acts as a miniature roller which gives a massaging action tending to destroy the fatty tissues of the body. Because of the larger thread and because of the relatively loose mesh my fabric is also much easier to clean than ordinary fabrics, and is consequently more sanitary.

In Fig. 4 a section of another form of my elastic material is shown in detail. In this form the material consists of a rubber sheet 15 provided with alternate thin and thick parallel streaks 16 and 17, respectively. This material is conveniently made by running a sheet of rubber through a pair of calender rolls, one of which is provided with parallel longitudinal ridges. This elastic material has the faculty of stretching transversely of the thin and thick streaks without narrowing down appreciably in a longitudinal direction or narrowing down unequally and, due to the alternate thin and thick streaks or corrugations, this material, when used in figure molding and reducing garments, gives a massaging action tending to destroy the fatty tissues of the body. The corrugations are preferably of rounded contour in section as shown in Fig. 4 so as to give greater comfort when adjacent the body of the wearer. This elastic material can be united with either a silk lining or stockinet facing subsequent to its manufacture if desired.

In Fig. 5 another modification of my elastic material is shown in section. The material here comprises a rubber sheet 20 united to an ordinary stockinet 21 by passing the two through a pair of calendering rollers one of which is provided with parallel longitudinal ridges. As in the above mentioned modifications of my elastic material the rubber sheet 20 is formed into alternate thin and thick parallel streaks, in this case due to the roller provided with ridges. The stockinet 21 is forced into the rubber sheet 20 and follows the contour of the alternate thin and thick streaks. The properties of this modification of my elastic material are similar to those of the material shown in Figs. 1–3 except for the advantages in the use of the heavy stockinet such as greater absorption of perspiration. If a silk lining is to be united with the sheet of rubber and stockinet, the stretch of the stockinet is limited to substantially the stretch of the silk thereby preventing the silk from breaking.

It will be evident that the invention is capable of various modifications and adaptations not specifically described but included within the scope of the appended claims.

The invention claimed is:

1. An elastic fabric comprising a sheet of rubber, a layer of cloth pressed into one side of the rubber and not materially limiting the stretch thereof, and a layer of cloth pressed into the other side of the rubber and having parallel ridges forming alternate thin and thick streaks in the rubber enabling same to stretch in a direction transverse to said ridges without shortening unequally in the direction of said ridges.

2. An elastic fabric comprising a layer of stockinet having alternate loosely knit portions enabling same to stretch and closely knit portions limiting the amount of stretch, and a sheet of rubber pressed into said stockinet and united with the loosely knit and closely knit portions thereof.

3. An elastic fabric comprising a layer of stockinet having alternate loosely knit portions enabling same to stretch in one direction and closely knit portions limiting the amount of such stretch, said closely knit portions forming spaced parallel ridges running transversely to the direction of stretch, and a sheet of rubber pressed into said stockinet and molded thereby into alternate thin and thick streaks enabling same to stretch in a direction transverse to said ridges without shortening appreciably in the direction of said ridges.

4. An elastic fabric comprising a sheet of rubber, a layer of cloth pressed into one side of the rubber and not materially limiting the stretch thereof, and a second less extensible layer of cloth pressed into the other side of the rubber having parallel ridges forming alternate thin and thick streaks in the rubber and limiting the stretch of the rubber and the first-mentioned layer of cloth.

Signed at New York in the county of New York and State of New York this 16th day of August, A. D. 1930.

EDWARD S. AXLINE.